United States Patent
Liu et al.

(10) Patent No.: US 9,548,898 B2
(45) Date of Patent: Jan. 17, 2017

(54) ENFORCING CONTEXT MODEL BASED SERVICE-ORIENTED ARCHITECTURE POLICIES AND POLICY ENGINE

(71) Applicant: International Business Machines Corporation, Armonk, NY (US)

(72) Inventors: Xin Peng Liu, Beijing (CN); Xi Ning Wang, Beijing (CN); Liang Xue, Beijing (CN); Ke Xin Zhou, Beijing (CN); Yu Chen Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 14/291,933

(22) Filed: May 30, 2014

(65) Prior Publication Data
US 2014/0280856 A1  Sep. 18, 2014

Related U.S. Application Data

(63) Continuation of application No. 12/275,435, filed on Nov. 21, 2008, now Pat. No. 8,788,566.

(30) Foreign Application Priority Data

Nov. 23, 2007 (CN) .......................... 2007 1 0187087

(51) Int. Cl.
G06F 15/16    (2006.01)
H04L 12/24    (2006.01)
G06F 21/62    (2013.01)

(52) U.S. Cl.
CPC .......... *H04L 41/0893* (2013.01); *G06F 21/62* (2013.01); *H04L 41/5045* (2013.01)

(58) Field of Classification Search
CPC .................................................... H04L 41/0893
(Continued)

(56) References Cited

U.S. PATENT DOCUMENTS

| 2004/0193703 A1* | 9/2004 | Loewy ............... H04L 41/0893 709/220 |
| 2007/0033194 A1* | 2/2007 | Srinivas ................ G06Q 30/02 |

(Continued)

OTHER PUBLICATIONS

Author Unknown, Examination Report/Office Action for Chinese Counterpart Application No. CN200710187087.8, May 11, 2011, pp. 1-10, Published by the State Intellectual Property Office of the People's Republic of China (English translation not available).

United States Patent and Trademark Office, Office Action for U.S. Appl. No. 12/275,435, filed Sep. 16, 2010, pp. 1-25, Alexandria, VA, USA.

United States Patent and Trademark Office, Office Action for U.S. Appl. No. 12/275,435, filed Feb. 23, 2011, pp. 1-31, Alexandria, VA, USA.

United States Patent and Trademark Office, Office Action for U.S. Appl. No. 12/275,435, filed Aug. 16, 2012, pp. 1-31, Alexandria, VA, USA.

(Continued)

*Primary Examiner* — Glenford Madamba
(74) *Attorney, Agent, or Firm* — Lee Law, PLLC; Christopher B. Lee

(57) ABSTRACT

Instance documents related to policy enforcement are gathered according to a business requirement. The instance documents are instantiated from corresponding schema documents. An instantiated context model, including references to the gathered instance documents, is generated from a context model definition. A policy set to be enforced using the instantiated context model is generated according to the gathered instance documents. An enforcement sequence of policies in the policy set is determined. The policies are applied to the instantiated context model according to the enforcement sequence.

3 Claims, 7 Drawing Sheets

(58) Field of Classification Search
USPC .............................................. 709/201; 726/1
See application file for complete search history.

(56) References Cited

U.S. PATENT DOCUMENTS

| | | | |
|---|---|---|---|
| 2008/0021754 A1* | 1/2008 | Horn | G06Q 10/04 |
| | | | 705/7.31 |
| 2008/0077565 A1 | 3/2008 | Larvet | |
| 2008/0141336 A1* | 6/2008 | Haller | G06Q 20/382 |
| | | | 726/1 |
| 2009/0024713 A1* | 1/2009 | Strasenburgh | G06F 9/4856 |
| | | | 709/208 |
| 2009/0083110 A1* | 3/2009 | Markovic | G06Q 10/06316 |
| | | | 705/7.26 |

OTHER PUBLICATIONS

United States Patent and Trademark Office, Office Action for U.S. Appl. No. 12/275,435, filed Feb. 11, 2013, pp. 1-36, Alexandria, VA, USA.

United States Patent and Trademark Office, Office Action for U.S. Appl. No. 12/275,435, filed Oct. 7, 2013, pp. 1-39, Alexandria, VA, USA.

United States Patent and Trademark Office, Notice of Allowance for U.S. Appl. No. 12/275,435, filed Mar. 10, 2014, pp. 1-8, Alexandria, VA, USA.

* cited by examiner

ENFORCING CONTEXT MODEL BASED SERVICE-ORIENTED ARCHITECTURE POLICIES AND POLICY ENGINE

RELATED APPLICATIONS

This application claims priority to and claims the benefit of Chinese Patent Application Serial No. 200710187087.8 titled "METHOD FOR ENFORCING CONTEXT MODEL BASED SERVICE-ORIENTED ARCHITECTURE POLICIES AND POLICY ENGINE," which was filed in the State Intellectual Property Office of the People's Republic of China on Nov. 23, 2007, and which is incorporated herein by reference in its entirety; and this application is a continuation of and claims priority to and claims the benefit of U.S. patent application Ser. No. 12/275,435 titled "ENFORCING CONTEXT MODEL BASED SERVICE-ORIENTED ARCHITECTURE POLICIES AND POLICY ENGINE," which was filed in the United States Patent and Trademark Office on Nov. 21, 2008, which has a current status of "Allowed," and which is also incorporated herein by reference in its entirety.

BACKGROUND OF THE INVENTION

The present invention relates to Service-Oriented Architecture (SOA) of a computer network system, particularly to a method for enforcing context model based SOA policies and a policy engine.

Service-Oriented Architecture (SOA) is a software system architecture which is realized by connecting independent functional entities capable of completing specific tasks to meet requirements of business integration in an Internet environment. The SOA is a component model which links different function units (called services) of an application through interfaces and contracts properly defined among these services, wherein the definition of the interfaces is independent of the hardware platform, operating system and programming language for realizing services. The SOA uses the service-oriented modeling technique and WEB service technique to accomplish loose coupling between systems and thus realize integration and cooperation between the systems.

The SOA policy is an important component of the SOA system and is used for declarative description and execution of the SOA system behavior. In the SOA system, the usage of the SOA policy spans different phases across the SOA lifecycle, including design time validation, deployment time policy publication and package and runtime service selection, change management and impact analysis.

Generally, the SOA policy may be classified into the following types in different layers:

Business policy for business decision making and industry guideline compliance, etc.

Application policy for service selection during service invocation, etc.

Governance policy for enforcing rules for standards compliance, and defining system behaviors for a governance process, etc.

A main feature of SOA is that all the data and contexts are described in XML language, and a document containing such data and the contexts is called an SOA metadata document. Generally, the SOA metadata document may include: a service metadata document for describing contents relating to a service, a runtime information document for describing contents relating to the runtime information, and a document for describing other business contents. For example, the service metadata document may use Web Service Description Language (WSDL), XML Schema Definition (XSD), Web Service Policy (WS-Policy), Service Component Definition Language (SCDL), Business Process Execution Language (BPEL), Service Component Architecture (SCA) policy, etc. The runtime information document may use Simple Object Access Protocol (SOAP), Representational State Transfer (REST), etc. The document for describing other business contents may use Service Data Object (SDO), Web Ontology Language (OWL), etc.

Next some policy engines in the prior art will be briefly described.

I. Business Policy Engine

In the prior art, there are many business policy engines, such as ILOG JRule Engine, Drools, Mandarax, JLisa, JEOPS, OpenRules, etc.

The ILOG JRule Engine is a flexible, high performance execution platform suitable for standalone use with a J2SE or J2EE application. This Engine supports strong policy/rules language customization, for example, Business Action Language (BAL, which uses natural language syntax to define the policies/rules), ILOG Rule Language (IRL, which uses Java- or XML-like syntax to define the policies/rules), Business Rule Language Definition Framework, Java Language Integration which uses Java expression directly in IRL, etc.

Drools is an open source object-oriented policy/rule engine for Java. Drools provides for declarative logic programming and is flexible enough to match the semantics of the user's problem domain. Drools is an implementation of JSR94 specification. The related detailed description may be found in http://java-source.net/open-source/rule-engines/drools.

Mandarax is an open source Java class library for deducting policies/rules. It provides an infrastructure for defining, managing and querying policy/rule bases. The related detailed description may be found in http://java-source.net/open-source/rule-engines/mandarax.

JLisa is an open source framework for building business policies/rules accessible to Java and it is compatible with JSR94 specification. The related detailed description may be found in http://java-source.net/open-source/rule-engines/jlisa.

The Java Embedded Object Production System (JEOPS) is an open source Java based Forwarding Chaining policy/rule engine. This engine is used to power up the business process by the policies/rules in Java Application Servers, client applications, and Servlets. The related detailed description may be found in http://java-source.net/open-source/rule-engines/jeops-the-java-embedded-object-production-system.

OpenRules is a full-scale open source business policy/rule management framework. It efficiently uses MS Excel, Eclipse Integrated Development Environment (IDE) and open source Java libraries to create, deploy, execute and maintain different policy/rule engines with complex business logic. The related detailed description may be found in http://java-source.net/open-source/rule-engines/openrules.

Some policy/rule engines may support Forwarding Chaining for reasoning a set of policies/rules applied to specific policy subjects. The so-called Forwarding Chaining is a forwarding chaining for the set of rules in a rule system. Particularly, if the execution of rule 1 changes a state of a target system on which the current set of rules operates and causes rule 2 to be matched and executed, the reasoning from rule 1→ rule 2 is called forwarding. Thus, if there exists a chaining of rule 1→ rule 2 . . . → rule n, the reasoning of the rule engine on the whole chain is called forwarding chaining. The forwarding chaining is a mechanism which allows the policies/rules applied to the same knowledge space to be inter-triggered, that is, the execution of one policy/rule is triggered by the execution of another policy/rule.

In the forwarding chaining mechanism, the policies/rules are parsed as a memory model, and variables referenced in the condition part and action part of the policy/rule are represented as memory variables. During the execution of forwarding chaining, the deduction is done by updating the memory variables and interchanging states across the different policies/rules. FIG. 1 is a schematic diagram showing an example of the existing forwarding chaining mechanism. As shown in FIG. 1, "WM" represents working memory which could be regarded as a storage unit of variables of the policies/rules. The variable may be changed by another rule's execution. In the forwarding chaining mechanism, the most time consuming step is matching the WM with the condition part of the policy/rule. This step is to discover the effective WMs which have been changed by a rule's execution and which will trigger another rule.

There are lots of forwarding chaining algorithms in the prior art and the most famous is RETE algorithm. The main features of this algorithm are: (1) state-saving, i.e. after each change to the WM, the state (result) of the matching process is saved in $\alpha$ and $\beta$ memories (after next change of the WM, many of the results are usually unchanged, so the RETE algorithm avoids a lot of re-computation by keeping these results between successive WM changes); (2) sharing of nodes between productions with similar conditions, i.e. at the output of the network, when two or more productions have a common condition, the RETE algorithm uses a single $\alpha$ memory for the condition, rather than creating a duplicate memory for each production, and in the $\beta$ part of the network, when two or more productions have the same conditions, the same node are used to match these conditions, thereby avoiding duplication of the matching.

However, the existing business policy/rule engines have the following limitations:

1. The existing business policy/rule engines focus on enforcement of business policy/rule, and take no care of other types of SOA policy.

2. The existing business policy/rule engines lack dedicated solutions for the SOA feature, i.e. using XML format. For example, RETE algorithm assumes that both the policies/rules and the context to be validated will be parsed as the memory model to interchange states across different policy/rule's execution. However, in XML, Document Object Model (DOM) consumes a lot of memories and it is difficult to locate specified elements in a large XML document. Thus, the policies/rules and the applied model in XML format are not adapted to be loaded as the memory model periodically. In addition, the traditional way to validate the XML content does not require a memory model, and thus RETE algorithm will lose its position.

3. The existing business policy/rule engines always define their own policy/rule formats. So the policies/rules defined for one engine are difficult to be widely adopted and reused.

4. The existing business policy/rule engines cannot deal with the feature of using the XML language in the SOA system. So a complex mechanism needs to transform information and be integrated in the SOA system. For example, ILOG policy/rule engine is encapsulated as policy/rule services for usage in a FileNet workflow system.

5. In the existing business policy/rule engines, policy/rule expressions have fixed terminologies, such as Java specific expression, reserved XML structure or terms (RuleML, SWRL, etc.). It will lead to rigid engine implementation or reasoning infrastructure. In addition, application domain and contexts to which the policies/rules are applied are also fixed.

II. Application Policy Engine

In the prior art, there are some application policy engines which may be used in the SOA system. Typically, these application policy engines are based on ontology, such as IBM WebSphere Business Service Fabric (WBSF), Semantic Web Rule Language (SWRL) engine, SweetRules engine, TRIPLE engine, SEW engine, etc.

WBSF is a dynamic assembler for selecting service endpoint leveraging ontology. It only uses terms in OWL file to define a condition part of the policy.

SWRL is based on a combination of OWL DL and OWL Lite sublanguages of the Web Ontology Language (OWL) with Unary/Binary Datalog RuleML sublanguages of Rule Markup Language (RuleML). It extends the set of OWL axioms to include Horn-like policies/rules. It thus enables Horn-like policies/rules to be combined with an OWL knowledge base.

The SweetRules engine is an open source integrated set of tools for semantic web rules and ontology. It revolves around the Rule Markup/Modeling Language (RuleML) emerging standard for semantic web rules and supports the related SWRL and the OWL standard for semantic web ontology. The related detailed description may be found in http://java-source.net/open-source/rule-engine s/sweetrules.

The TRIPLE engine is a semantic Web engine supporting RDF and a subset of OWL Lite. Its syntax is based on F-logic and supports an important fragment of first-order logic. The related detailed description may be found in http://triple.semanticweb.org.

The SEW engine is an implementation of a RDF schema engine. It includes some XML schema data type support and may read RDF graphs serialized in RDF/XML and N-TRIPLES formats.

However, such application policy engines only support one-step reasoning and are adapted to a specific industry, rather than other fine grained policy subjects, such as a project, an application or a service. Additionally, it also relates to many complex standards, which leads to the application policy engines being complex.

III. Service Modeling Language (SML) Based Engine

SML is defined by IBM, Microsoft, BEA, Intel etc. for XML based IT service management. It provides a rich set of constructs for describing models of complex IT services and systems. The SML model is a set of interrelated XML documents. The XML documents contain information about the parts of an IT service, as well as the constraints which each part must satisfy for the IT service to function properly.

The documents in a SML model include definition documents and instance documents.

A definition document is described with XML Schema Definition (XSD) language and Schematron Schema language and is a subset of documents in the SML model that describes the schemas and polices/rules that govern the structure and content of the documents in the model. The SML specification define two kinds of definition documents, i.e. XML schema documents which conform to SML's profile of XML schema and policy/rule documents which conform to SML's profile of Schematron. The policy/rule documents are Boolean expressions that constrain the structure and content of the documents in the model.

An instance document is in XML format and is a subset of documents in the SML model that describes the structure and content of the modeled entities.

However, the SML based engine is only for IT system management because the SML's original goal is for system management, model drive modularity, re-use and standardization, such as Microsoft System Management Server. In addition, the SML based engine is only for one-step validation of system configuration and report. SML utilizes Schematron as policy/rule expression to validate its instance documents. According to the Schematron specification, the policies/rules within the standard Schematron may only report a diagnosis message in text string format when there is a violation to policy/rule restrictions. The SML specification extends the capability of validation report to bring in structured output, but this extension only provides a standard output of elements or attributes, without further semantics.

BRIEF SUMMARY OF THE INVENTION

The present invention is directed to the above technical problems to provide a method for enforcing context model based SOA policies and a policy engine, which can flexibly form a policy scope according to scenarios and purposes of policy enforcement and can be adapted to various types of SOA policies.

According to one aspect of the present invention, it is provided with a method for enforcing context model based Service-Oriented Architecture (SOA) policies, which comprises: gathering instance documents related to policy enforcement according to a business requirement; generating an instantiated context model using the gathered instance documents; generating a policy set to be enforced according to the gathered instance documents; determining an enforcement sequence of policies in the policy set; and applying the policies to the instantiated context model according to the enforcement sequence.

According to another aspect of the present invention, it is provided with a policy engine for enforcing context model based Service-Oriented Architecture (SOA) policies, which comprises: a gathering module that gathers instance documents related to policy enforcement according to a business requirement; a context model generator that generates an instantiated context model using the gathered instance documents; a policy set generator that generates a policy set to be enforced according to the gathered instance documents; a sequence determining module that determines an enforcement sequence of policies in the policy set; and a policy applying module that applies the policies to the instantiated context model according to the enforcement sequence.

DETAILED DESCRIPTION OF THE INVENTION

It is believed that the above and other objectives, features and advantages of the present invention will become clearer through the following detailed description of the embodiments of the present invention in conjunction with the drawings.

Figure 1:
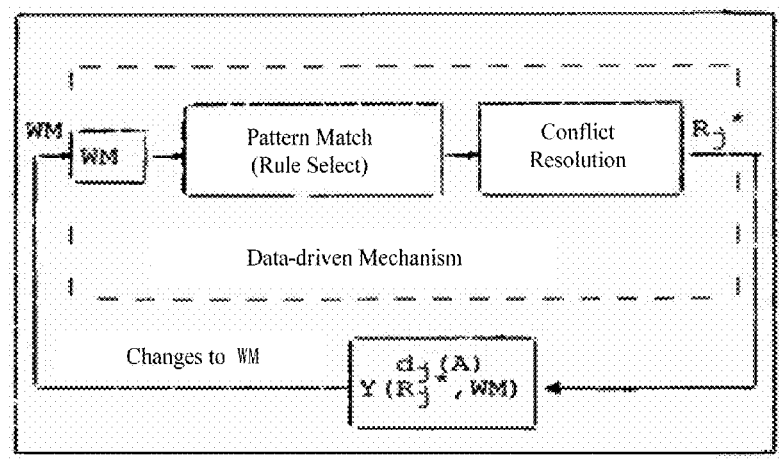
FIG. 1 is a schematic diagram showing an example of the existing forwarding chaining mechanism.

FIG. 1 has been described in the Background of the Invention and its description is omitted here.

Figure 2:
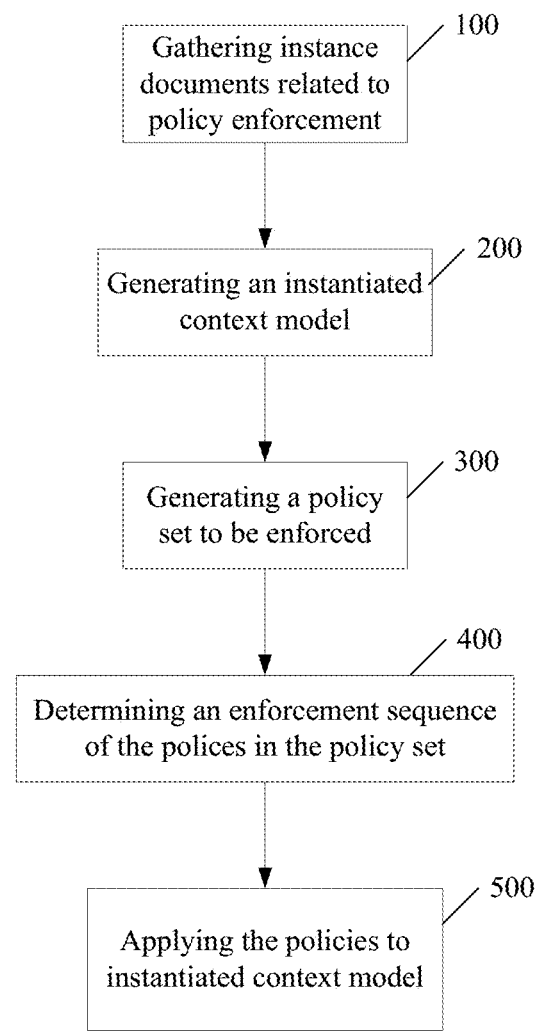
FIG. 2 is a flowchart of a method for enforcing context model based SOA policies according to one embodiment of the present invention.

FIG. 2 is a flowchart of a method for enforcing context model based SOA policies according to one embodiment of the present invention. This embodiment will be described in detail in conjunction with the figure.

As shown in FIG. 2, at Step 100, instance documents related to policy enforcement are gathered according to a business requirement, as a context of the policies to be enforced.

In this embodiment, when policy enforcement starts, a user may determine a scope of the instance documents related to the policy enforcement according to the business requirement and existing application modules. According to the scope, the documents compliant with the requirement may be selected and instantiated to obtain the instance documents. These documents could be from a context model template generated during the generation of a SOA policy based on a context model, runtime platform including Web application server, workflow engine, business analysis tool, etc. Typically, these documents may be SOA metadata documents, such as WSDL documents, XSD documents, WS-policy, SOAP messages, and OWL documents, etc., and may also be non-XML documents containing object information.

In fact, relativity between the instance documents and the SOA policies is specified during policy generation phase. That is, when the SOA policies are generated, the corresponding context model associated with the policies has been determined. Here the documents in the context model are the documents in using XML Schema Definition Language (XSDL). While the SOA policies are enforced, the XSDL documents need to be replaced with the XML instance documents compliant with the XML Schema definition. Specific application semantics may determine which instance document to be used for replacement.

In another embodiment, the XML instance documents may be gathered based on the context model associated with the policies during the policy generation phase. According to the business requirement, each XML Schema document in the corresponding context model associated with the policies is designated with an instance document, wherein the instance document structurally conforms to the definition of the corresponding XML Schema document.

Then, whether the instance document is in XML format is checked. If the instance document is not in XML format, the non-XML instance document is converted into the XML instance document which conforms to certain pre-defined XML Schemas. For example, in some business scenarios, some documents which should be constrained by business policies may not be originally written as the XML documents. Thus, a file format conversion is performed while keeping the same semantics. So each of the gathered instance documents associated with the policy enforcement is in XML format.

At Step 200, an instantiated context model is generated using the gathered instance documents. In this embodiment, inter-document references between each of the gathered instance documents and other instance documents are established, and then these instance documents are aggregated according to the established inter-document references to generate the instantiated context model.

In another embodiment, the instantiated context model may be an instance of the context model associated with the policies used in the SOA policy generation. As described in the above, each document in the context model for generating the policy is the abstract XML document and may be described in XML Schema Definition Language. When the instance documents are gathered, each of the XML Schema documents is replaced with the corresponding XML instance document. Correspondingly, the abstract context model may become the instantiated context model on which the policies may be enforced by the replacement of the instance documents.

From the view of XML, when the instantiated context model is described with the syntax defined in the XML specification, according to the context model used in the policy generation, the reference identifications to the abstract XML documents in the context model are modified as the reference identifications to the corresponding instance documents. Thus the aggregation relation among the abstract XML documents becomes the aggregation relation among the gathered instance documents and the obtained new model is the instantiated context model. From the view of SML, when the instantiated context model is described with the syntax defined in the SML specification, the reference to a Uniform Resource Identifier (URI) of each XML Schema document in the SML aggregation document generated in the policy generation is modified as the reference to a Uniform Resource Identifier (URI) of the corresponding gathered instance document. Thus a new SML aggregation document is generated. The new SML aggregation document and the gathered instance documents form the instantiated context model described with the SML syntax. In this embodiment, the SML is selected to implement the instantiated context model.

At Step 300, a policy set to be enforced is generated according to the gathered instance documents. This policy set will be applied to the instantiated context model generated in Step 200. In this embodiment, according to the scope of the gathered instance documents, the related policies are determined. These policies are the pre-generated context model based policies and stored in a local or remote server. The policies are in condition/action format. In this embodiment, the policy is based on SML. Specifically, the policy utilizes Schematron and has the extendable action part. An example of the SML based policy is given as follows:

```
<?xml version="1.0" encoding="UTF-8"?>
<schema xmlns="http://www.ascc.net/xml/schematron"
    xmlns:sml="http://schemas.serviceml.org/sml/2006/10">
    <title>Log Policy</title>
    <ns uri="http://com.ibm.calico.request/" prefix="req" />
    <ns uri="http://schemas.serviceml.org/sml/function/2006/07"
```

```
    prefix="smlfn"/>
    <pattern name="Log Gold WS Access">
        <rule
            context="/mediationConfiguration/destination">
            <report id="endpoint"
test="
(smlfn:deref(../destination[@name='PolicyMediation']/mediation/step/
config/model/docLocation[@id='role0'])/req:headers/req:header[@key=
'qos']/@value='GOLD') and (qos/text( )='GOLD')">
                LOG{http://com.ibm.cn/soa/example}|Web service
with Endpoint - <value-of select="mediation/step/config/transform/
targetSelection/target/text( )"/> has been
accessed!|C:\WS-Access-Log.txt
            </report>
        </rule>
    </pattern>
</schema>
```

Wherein, the condition part of the policy is:

```
(smlfn:deref(../destination[@name='PolicyMediation']/mediation/
step/config/model/docLocation [@id='role0'])/req:headers/
req:header[@key='qos']/@value='GOLD') and (qos/text( )='GOLD')">;
``` the action part of the policy is:

```
LOG{http://com.ibm.cn/soa/example}|Web service with Endpoint -
<value-of select = "mediation/step/config/transform/targetSelection/
target/text( )"/> has been accessed!|C:\WS-Access-Log.txt.
```

After the related policies are determined, the determined policies are collected to generate the policy set.

Further, after the related policies are determined, the determined policies may be filtered according to a pre-determined document-policy binding to further refine the policies, and then the filtered policies are collected to generate the policy set. Alternatively, the document-policy binding may be generated according to application logic.

After the policy set is generated, at Step 400, an enforcement sequence of the policies in the policy set is determined. In this embodiment, a priority is set for each of the policies. In general, if the policies are independent of each other, their priorities are equal, and if there are association relations among some policies, the priorities of these policies are different. Of course, the user may set different priorities to the policies according to the requirements, but cannot change the association relation among the policies. Then, according to the priorities, the policies in the policy set are sequenced.

Figure 3:
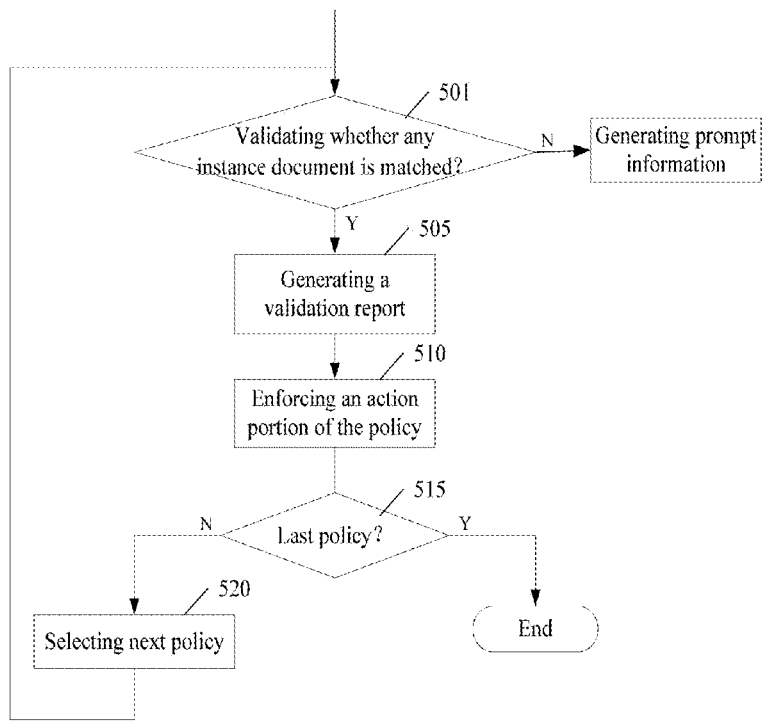
FIG. 3 is a flowchart of a method of applying the policies to the instantiated context model in the embodiment shown in FIG. 2.

At Step 500, the policies are applied to the instantiated context model generated at Step 200 according to the enforcement sequence of the policies determined at Step 400. FIG. 3 shows the flowchart of the step of applying the policies.

As shown in FIG. 3, at Step 501, one policy is applied to the instantiated context model to validate whether any instance document in the instantiated context model is matched. The validation includes two aspects: one is to validate structure of the instance document using a schema document in the policy; the other is to validate content of the instance document using the condition part of the policy. In the case that the policy is based on the SML, a XML schema document is used to validate the structure of the instance document and a condition part of the policy in Schematron format is used to validate the content of the instance document.

If the structure validation and the content validation of the instance document are matched, it is indicated that the instance document matches the policy. At Step 505, a validation report is generated. For example, the syntax for the validation report of the policy described with Schematron is: Action Name {Action Namespace URI}|parameter 1| . . . |parameter n, wherein the expression for each parameter could be a constant string or the following Schematron allowed tags representing the SML model context:

<valu-of select="XPath Expression for SML model document element or attribute or else"/>, which is used to retrieve XPath specified XML element/attribute value;
<name path="XPath Expression for SML model document element or attribute or else"/>, which is used to get XPath specified XML element/attribute tag name.

In this embodiment, the validation report is the same as the action part of the policy. In the above SML based policy, the validation report is:

LOG{http://com.ibm.cn/soa/example}|Web service with Endpoint - <value-of select="mediation/step/config/transform/targetSelection/target/text( )"/> has been accessed!|C:\WS-Access-Log.txt.

If no instance document is matched, prompt information is generated.

At Step 510, according to the generated validation report, the action part of the policy is enforced. In this embodiment, the information of the action semantic module to be enforced is obtained from the validation report and the action semantic module is loaded. The information of the action semantic module includes action name and parameters. The action semantic module may be a common action semantic module provided by the system or an action semantic module defined by the user. Moreover, the action semantic module may be pluggable and invoked in the runtime. Then, the parameters in the loaded action semantic module are set and thus the action semantic module is executed. The set parameter may be a constant string or a specified value in the instance document.

At Step 515, it is determined whether the policy is the last policy. If it is the last policy, the policy enforcement is finished. If it is not the last policy, next policy is selected (Step 520) and the policy enforcement returns to Step 501.

It can be seen from the above description that the method for enforcing context model based SOA policies of this embodiment may flexibly gather the instance documents according to scenarios and purposes of the policy enforcement to define the policy scope, such as project, application, service, etc., and may be applied to various types of the SOA policies.

Comparing with the existing business policy enforcement solution, the method for enforcing context model based SOA policies of this embodiment has the following advantages:

1. Provide a dedicated solution for the SOA system, which can deal with the XML based SOA policies;
2. Comply with the SOA related standards, such as SML, XPath and Schematron, etc.
3. Applied to various SOA policies and combine with business and IT information.

Comparing with the existing ontology based application policy enforcement solution, the method for enforcing context model based SOA policies of this embodiment has the following advantages:

1. Provide self-contained terms and relations in the SML model for specific application scenario, wherein built-in XML elements are regarded as natural definition of the terms and built-in XML document structure and XML/SML reference are regarded as the natural way to describe the relation among the elements, so that the domain specific semantics and relation in the XML documents may be re-used without predefined ontology, such as WS-policy, WS-RM policy, etc.;
2. Provide a flexible policy scope, such as project, application, service, etc. instead of only specific domain;
3. Easy to use because it is based on a set of simple SOA/XML standards, such as SML, Schematron, XPath etc.;
4. Easy to be integrated into other tools adopting SML.

Comparing with the existing WBSF, the method for enforcing context model based SOA policies of this embodiment has the following advantages:

1. Stronger semantic expression capability: it may describe any required policy/rule content regarding specified SML context model structures and contents and extensible action modules, while the WBSF may only provide policies dealing with runtime service selection due to different business requirement and IT QoS;
2. More flexible policy context model: it allows the fully reuse of the existing IT system metadata with on-demand SML model scope, while the policy may only be customized and extended based on the private OWL core ontology of WBSF.

Comparing with the standard SML based policy enforcement solutions, in the method for enforcing context model based SOA policies of this embodiment, the action semantic module may be pluggable, which enables the action part of the policy to be extended and reused.

Figure 4:
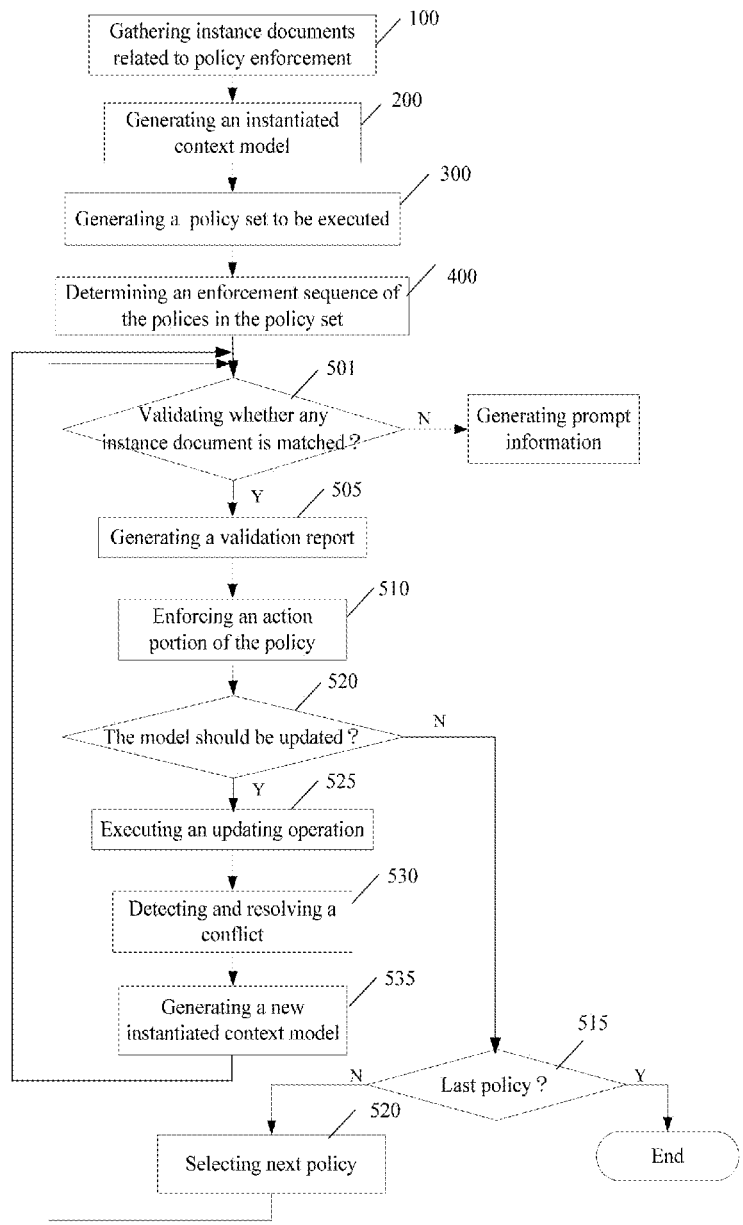
FIG. 4 is a flowchart of a method for enforcing context model based SOA policies according to another embodiment of the present invention.

FIG. 4 is a flowchart of a method for enforcing context model based SOA policies according to another embodiment of the present invention, wherein the descriptions of the portions which are the same as those of the previous embodiment are omitted. This embodiment will be described in detail as follows in conjunction with the figure.

This embodiment differs from the embodiment shown in FIG. 3 in that the forwarding chaining mechanism is introduced.

As shown in FIG. 4, after the action part of the policy is enforced (Step 510), at Step 520, it is determined whether the instantiated context model should be updated, i.e. whether the enforcement of the action part of the policy will change the instantiated context model, for example, add a new instance document, modify an existing instance document, or remove an existing instance document. If the instantiated context model should not be updated, Step 515 will be performed. If the instantiated context model should be updated, at Step 525, an updating operation is executed, i.e. add the new instance document, modify the existing instance document, remove the existing instance document, or their combination.

At Step 530, a conflict caused by the updating operation is detected and resolved. In this embodiment, the conflict caused by the updating operation includes:

1) Content conflict among two or more modifications when only modifying a certain document in the instantiated context model; and
2) Both modification and removal simultaneously executed on a certain document in the instantiated context model.

For the conflict 1), if the conflicted contents are compatible with each other, the modification with most modified contents is selected. So-called "compatible" means that the modified content of one modification equals or contains the content of another modification. If the conflicted contents are not compatible, which modification to be executed is determined automatically by executing the corresponding application logic, or a decision is made by human machine interaction. If the above operations cannot resolve the conflict, it is reported that the modification to the document fails, and all the operations causing the conflict are omitted.

For the conflict 2), the removal is prior to the modification, because in one-step policy enforcement, all the modifications will be invalid as long as there is the removal.

At Step 535, a new instantiated context model is generated according to the updated instance documents and the instantiated context model. Then, the policies in the policy set are re-applied to the new instantiated context model (Step 501).

Further, when the policies are re-applied to the new instantiated context model, only the updated instance documents in the new instantiated context model are validated.

It can be seen from the above description that the method of enforcing context model based SOA policies of this embodiment further provides the context model based forwarding chaining and has stronger policy/rule reasoning capability. It may inter-relate different policies to do the context model based policy reasoning, model self-updating and multiple policy triggering, so that the self-healing and self-evolving capabilities may be improved.

An example of the context model described in SML is given as follows to illustrate the method of enforcing context model based SOA policies of the above embodiment.

In this example, the gathered instance documents include Userinfos.xml, UserPrivileges.xml, HRService4DepartManagement.wsdl and HRService4StaffManagement.wsdl, wherein the UserInfos.xml and UserPrivileges.xml are as follows:

```
UserInfos.xml:
    <?xml version="1.0" encoding="UTF-8"?>
    <UserInfos xmlns= "http://example.ibm.com.cn/user">
        <User>
            <ID>000001</ID>
            <Name>Tom</Name>
            <band>9</band>
            <isManager>y</isManager>
        </User>
        ...
    </UserInfos>
UserPrivileges.xml:
    <?xml version="1.0" encoding="UTF-8"?>
    <UserPrivileges xmlns= "http://example.ibm.com.cn/userpvg">
        <UserPrivilege>
            <ID>000001</ID>
            <Role>Manager</Role>
            <HRService>
                http://localhost:9080/mrgservices/StaffService
            </HRService>
        <UserPrivilege>
        ....
    </UserPrivileges>
```

According to the gathered instance documents, the instantiated context model Context.xml is generated. Specifically, firstly a URL path (such as file:/ . . . /Userinfos.xml) of each of the instance documents is obtained, and then the following XML document is generated as the instantiated context model. This XML document uses each Document element under the DocumentList element to reference the corresponding instance document. When making the reference, the attribute sml:ref="true" defined in the SML specification is used to identify each Document element so that the inter-document reference to the instance document corresponding to the given URL in the sml:uri may be realized. That is, from the view of semantics, XML sub-element of the instance document corresponding to the URL is embedded into each Documents element. The DocumentList element lists the references to all the instance documents, so the following document is an aggregation of all the instance documents from the view of the semantics defined in the SML specification.

The instantiated context model Context.xml is as follows:

```
<?xml version="1.0" encoding="UTF-8"?>
<Context xmlns = "http://com.ibm.biz.policy/context/"
        xmlns:sml="http://schemas.serviceml.org/sml/2007/02">
    <DocumentList>
        <Document role="role0" sml:ref="true">
            <sml:uri>file:/.../ UserInfos.xml</sml:uri>
        </Document>
        <Document role="role1" sml:ref="true">
            <sml:uri>file:/.../UserPrivileges.xml</sml:uri>
        </Document>
            <Document role="role2" sml:ref="true">
                <sml:uri>file:/.../HRService4DepartManagement.wsdl
                </sml:uri>
            </Document>
            <Document role="role3" sml:ref="true">
                <sml:uri>file:/.../ HRService4StaffManagement.wsdl
                </sml:uri>
            </Document>
    </DocumentList>
</Context>
```

According to the gathered instance documents, the related policy set may be determined. In this example, which policies will be applied to the instantiated context model is determined according to the application requirement. In this example, two policies, i.e. updateRole.sch and updateHRservice.sch, are introduced. Of course, the policies may be added or deleted according to the application requirement.

After the policy set is determined, the policy set is associated with the instantiated context model. In this embodiment, in the instance documents aggregated in the instantiated context model, the corresponding Document sub-elements are added into the DocumentList element in the similar manner to the instance document aggregation, so that all the policy documents may be aggregated. Thus, the instance documents and the policy documents applied to the instance documents are aggregated in the instantiated context model. According to the aggregated documents, the policy set to be enforced may be recognized.

In this example, the policies updateRole.sch and updateHRservice.sch are as follows:

```
UpdateRole.sch policy:
<?xml version="1.0" encoding="UTF-8"?>
<schema xmlns="http://www.ascc.net/xml/schematron"
        xmlns:sml="http://schemas.serviceml.org/sml/2007/02">
    <title>Update User Role Policy</title>
    <ns uri="http://com.ibm.biz.policy/context/" prefix="ctx"/>
```

```
        <ns uri="http://example.ibm.com.cn/user" prefix="usr" />
        <ns uri="http://example.ibm.com.cn/userpvg" prefix="pvg" />
        <ns uri="http://schemas.serviceml.org/sml/function/2006/07" prefix="smlfn"/>
        <pattern name=" Update User Role to Senior Manager">
            <rule context="smlfn:deref(/ctx:Context/ctx:DocumentList/
                    ctx:Document[@role='role0'])/usr:user">
                <variable name="uid" select="usr:ID/text( )"/>
                <report id="userrole" test="usr:band/text( )>=9 and usr:isManager/text( )='y'">
                UPDATEMODEL{http://com.ibm.cn/soa/standard/example}|<name path ="
                    smlfn:deref(/ctx:Context/ctx:DocumentList
ctx:Document[@role='role1'])/pvg:UserPrivilege[pvg:ID/text( )=$uid]/pvg:Role"/>|SeniorManager
                </report>
            </rule>
        </pattern>
</schema>
UpdateHRservice policy:
<?xml version="1.0" encoding="UTF-8"?>
<schema xmlns="http://www.ascc.net/xml/schematron"
    xmlns:sml="http://schemas.serviceml.org/sml/2007/02">
    <title>Update UR Service Endpoint Policy</title>
    <ns uri="http://com.ibm.biz.policy/context/" prefix="ctx"/>
        <ns uri="http://example.ibm.com.cn/userpvg" prefix="pvg" />
    <ns uri="http://schemas.xmlsoap.org/wsdl/" prefix="wsdl" />
    <ns uri="http://schemas.xmlsoap.org/wsdl/soap/" prefix="wsdlsoap" />
    <ns uri="http://schemas.serviceml.org/sml/function/2006/07" prefix="smlfn"/>
    <pattern name="Update UR Service Endpoint Manager">
        <rule context="smlfn:deref(/ctx:Context/ctx:DocumentList/
                ctx:Document[@role='role1'])/pvg:UserPrivilege">
            <report id="endpoint" test="pvg:Role/text( )='SeniorManager'">
            UPDATEMODEL{http://com.ibm.cn/soa/standard/example}|<name
path="pvg:HRService"/>| <value-of
select="smlfn:deref(/ctx:Context/ctx:DocumentList/ctx:Document[@role='role2'])//wsdl:port[@
name='HRService4DepartManagement']/wsdlsoap:address/@location"/>
            </report>
        </rule>
    </pattern>
</schema>
```

When the above two policies are applied to the instantiated context model Context.xml, if the updateRole.sch policy is matched first, the enforcement result of the action of the policy is that in the UserPrivileges.xml, the role of the user with ID 000001 is updated to "SeniorManager", and the instantiated context model Context.xml is updated. Then the above policies are applied to the new instantiated context model and the updateHRservice policy is matched. Then the action of the updateHRservice policy is enforced. The HRService endpoint is updated to the one HRservice contained in the HRService4StaffManagement.wsdl.

Figure 5:
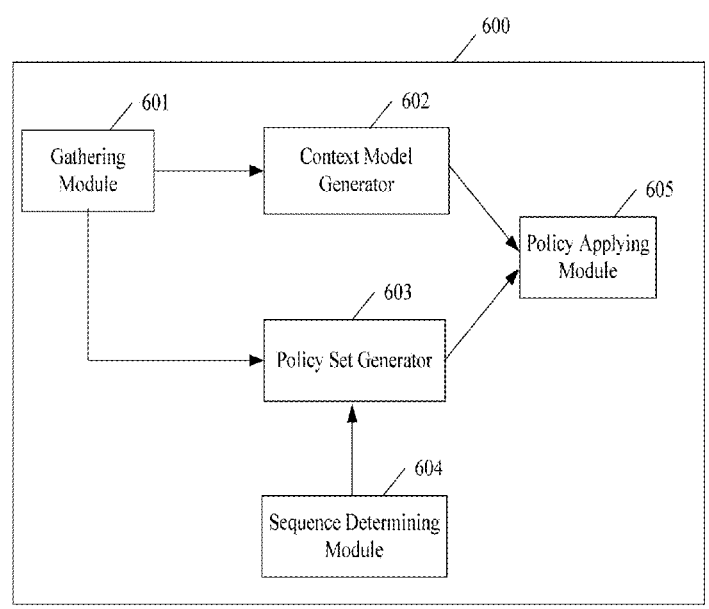
FIG. 5 is a schematic block diagram of a policy engine for enforcing context model based SOA policies according to one embodiment of the present invention.

Under the same inventive concept, FIG. 5 is a schematic block diagram of a policy engine for enforcing context model based SOA policies according to one embodiment of the present invention. In this embodiment, the descriptions of the portions which are same as those of the previous embodiment are omitted. This embodiment will be described in detail as follows in conjunction with the figure.

As shown in FIG. 5, the policy engine 600 for enforcing context model based SOA policies of this embodiment comprises: a gathering module 601 which gathers instance documents related to policy enforcement; a context model generator 602 which generates an instantiated context model using the gathered instance documents; a policy set generator 603 which generates a policy set to be enforced according to the gathered instance documents; a sequence determining module 604 which determines an enforcement sequence of policies in the policy set; and a policy applying module 605 which applies the policies to the instantiated context model.

When the policy engine 600 is used to enforce the context model based SOA policies, the user may determine a scope of the related instance documents according to the business requirement and the current application modules, and use the gathering module 601 to gather the related instance documents. In this embodiment, in the gathering module 601, a selecting unit selects and instantiates the eligible documents to obtain the instance documents. And then a checking unit checks whether these instance documents are in XML format. The non-XML instance documents are converted into the instance document in XML format in a converting unit so that each of the gathered instance documents is in XML format.

Alternatively, in the gathering module 601, an instance document may be designated to each XML Schema document compliant with the business requirement in the context model associated with the policies by a document designating unit, wherein the instance document structurally conforms to the definition of the corresponding XML Schema document.

The gathered instance documents are provided to the context model generator 602 to generate the instantiated context model. In the context model generator 602, a reference establishing unit establishes the inter-document references between each of the instance documents and other instance documents, and then an aggregator aggregates these instance documents by means of the established inter-document references to generate the instantiated context model. In this embodiment, SML is selected to implement the instantiated context model.

In another embodiment, the instantiated context model may be an instance of the context model associated with the policies used in the SOA policy generation. So in the context model generator 602, when the instantiated context model is described with the syntax defined in the XML specification, the reference identifications to the abstract XML documents in the context model are modified as the reference identifications to the corresponding instance documents. In this way, the aggregation relations among the abstract XML documents in the policy generation are changed as the aggregation relations among the gathered instance documents and the obtained new model is the instantiated context model.

Alternatively, in the context model generator 602, when the instantiated context model is described with the syntax defined in the SML specification, the reference to the Uniform Resource Identifier (URI) of each XML Schema document in the SML aggregation document generated in the policy generation is modified as the reference to the Uniform Resource Identifier (URI) of the corresponding gathered instance document, thereby generating a new SML aggregation document. The new SML aggregation document and the gathered instance documents form the instantiated context model described with the SML syntax.

Then according to the gathered instance documents, the user uses the policy set generator 603 to generate the policy set. In this embodiment, in the policy set generator 603, the user uses a policy determining unit to determine the related policies. These policies are the pre-generated context model based SOA policies which adopt the condition/action format. Then a collecting unit collects the determined policies as the policy set.

Further, after the related policies are determined by the policy determining unit, a filtering unit filters the determined policies based on a document-policy binding to further refine the policies. The document-policy binding may be pre-determined or generated based on application logic. Then, the collecting unit collects the filtered policies to form the policy set.

After the policy set is determined, the enforcement sequence of the policies in the policy set is determined by the sequence determining module 604. In the sequence determining module 604, the policy priorities may be set by a priority setting unit. In general, if the policies are independent of each other, their priorities are equal, and if there are association relations among some policies, the priorities of these policies are different. Of course, the user may also set different priorities to the policies according to the requirement, but cannot change the association relations of the policies. Then a sequencing unit sequences all the policies in the policy set.

Figure 6:
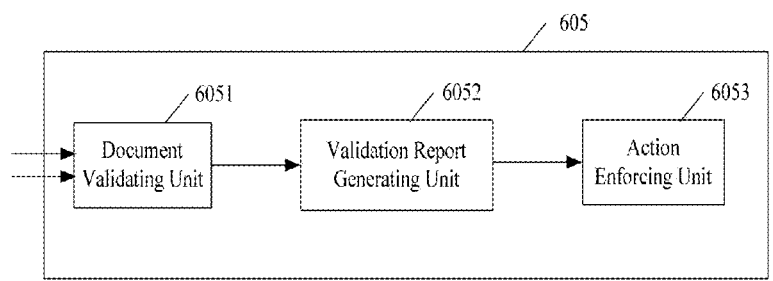
FIG. 6 is a schematic block diagram of the policy applying module in the embodiment shown in FIG. 5.

The instantiated context model and the sequenced policy set are provided to the policy applying module 605 which applies the policies in the policy set to the instantiated context model. FIG. 6 shows the schematic block diagram of the policy applying module 605.

As shown in FIG. 6, in the policy applying module 605, a document validating unit 6051 applies the policies to the instance documents in the instantiated context model to validate whether any instance document is matched. In this embodiment, a structure validating unit (not shown) in the document validating unit 6051 validates the structure of the instance document using the schema document in the policy. And then a content validating unit (not shown) in the document validating unit 6051 validates the content of the instance document using the condition part of the policy. If the validation result is that the instance document is matched, a validation report generating unit 6052 generates the validation report. The validation report contains the information of the action part of the policies to be enforced. Particularly, the information includes the action name and the parameters. Then an action enforcing unit 6053 enforces the actions of the corresponding policies. In this embodiment, in the action enforcing unit 6053, a loading unit loads the corresponding action semantic modules. In this embodiment, the action semantic module may be a common action semantic module provided by the system or an action semantic module defined by the user. These action semantic modules may be plugged into the policy engine 600 and may be invoked in the runtime. Then a parameter setting unit sets the parameters of the action semantic modules and an executing unit executes the action semantic modules. The set parameters may be constant strings or specified values in the instance documents.

It should be noticed that the policy engine 600 for enforcing context model based SOA policies of this embodiment and its components may be implemented by hardware circuit such as Very Large Scale Integrated Circuit or gate array, semiconductor such as logic chips and transistors, or programmable hardware device such as field programmable gate array, programmable logic device, and by software executed on various types of processors, and by the combination of above hardware circuit and software. Also, the policy engine 600 for enforcing context model based SOA policies of this embodiment may operatically realize the method for enforcing context model based SOA policies of the embodiments shown in FIG. 2.

It can be seen from the above description that the policy engine for enforcing context model based SOA policies of this embodiment may flexibly gather the instance documents according to the scenarios and purposes of the policy enforcement to define the policy scope, such as project, application, service, etc., and may be applied to any type of the SOA policies.

Figure 7:
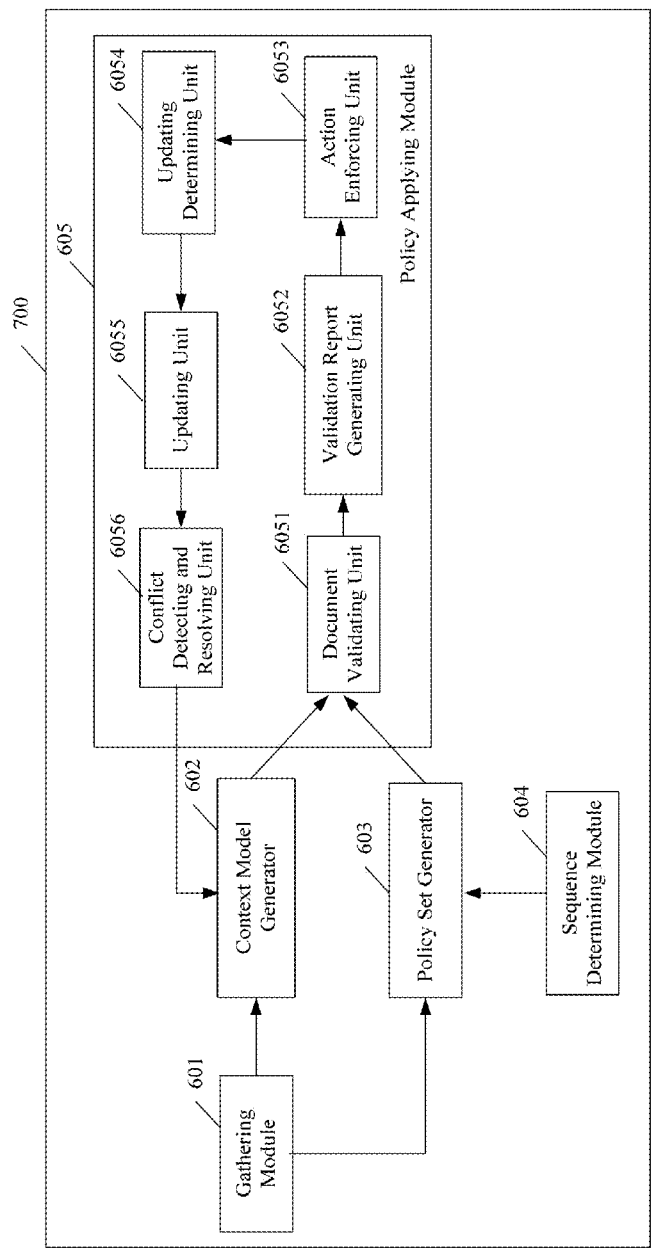
FIG. 7 is a schematic block diagram of a policy engine for enforcing context model based SOA policies according to another embodiment of the present invention.

FIG. 7 is a schematic block diagram of a policy engine for enforcing context model based SOA policies according to another embodiment of the present invention, wherein the same portions as the previous embodiment adopt the same reference numbers and their descriptions are omitted. This embodiment will be described in details in conjunction with the figure.

This embodiment differs from the embodiment shown in FIG. 5 in that the forwarding chaining mechanism is introduced.

As shown in FIG. 7, in the policy applying module 605, after the action enforcing unit 6053 enforces the actions of the matched policy, an updating determining unit 6054 determines whether the instantiated context model should be updated, i.e. whether the enforcement of the policy will change the instantiated context model, for example, add an instance document, modify an instance document, remove an instance document or their combination. If the updating determining unit 6054 determines that the instantiated context model should be updated, an updating unit 6055 performs the corresponding updating operation. In this embodiment, in the updating unit 6055, an adding unit is used to add an instance document, a modifying unit is used to modify the existing instance document, and a removing unit is used to remove the existing instance document from the instantiated context model. After the updating unit 6055 performs the corresponding updating operation, a conflict detecting and resolving unit 6056 detects whether there is a conflict caused by the updating operation, and resolves the conflict. Then the updated instance documents are provided to the context model generator 602 and are combined with the instantiated context model to generate a new instantiated context model. Next the policy applying module 605 applies the policies in the policy set to the new instantiated context model.

Further, when the policy applying module 605 applies the policies in the policy set to the new instantiated context model, it may only validate the updated instance documents in the new instantiated context model.

It should be noticed that the policy engine 700 for enforcing context model based SOA policies of this embodiment and its components may be implemented by hardware circuit such as Very Large Scale Integrated Circuit or gate array, semiconductor such as logic chips and transistors, or programmable hardware device such as field programmable gate array, programmable logic device, and by software executed on various types of processors, and by the combination of above hardware circuit and software. Also, the policy engine 700 for enforcing context model based SOA policies of this embodiment may operatically realize the method for enforcing context model based SOA policies of the embodiment shown in FIG. 4.

It can be seen from the above description that the policy engine for enforcing context model based SOA policies of this embodiment may further provide context model based forwarding chaining and have stronger policy/rule reasoning capability. It may inter-relate different policies to do the context model based policy reasoning, model self-updating and multi policy triggering, so that the self-healing and self-evolving capabilities may be improved.

Although the method for enforcing context model based SOA policies and the policy engine are described in detail in conjunction with the preferred embodiment, the present invention is not limited as above. It should be understood for persons skilled in the art that the above embodiments may be varied, replaced or modified without departing from the spirit and the scope of the present invention.

What is claimed is:

1. A method for enforcing context model based Service-Oriented Architecture (SOA) policies, comprising:
by a policy engine device:
gathering instance documents related to policy enforcement according to a business requirement, where the instance documents are instantiated from corresponding schema documents;
generating an instantiated context model, comprising:
establishing inter-document references between each of the gathered instance documents and a plurality of other instance documents;
aggregating according to the inter-document references;
creating a context model associated with policies used in SOA policy generation, where the context model comprises a set of abstract extensible markup language (XML) Schema documents;
describing the set of abstract XML Schema documents in XML Schema Definition Language; and
for each abstract XML Schema document of the set of abstract XML Schema documents, replacing the respective abstract XML Schema document with a corresponding XML instance document to generate the instantiated context model; and
where the method further comprises:
applying a plurality of pre-generated context model based policies, with each context model based policy in a condition-action format.

2. A policy engine for enforcing context model based Service-Oriented Architecture (SOA) policies, comprising:
a memory; and
at least one processor programmed to:
gather instance documents related to policy enforcement according to a business requirement, where the instance documents are instantiated from corresponding schema documents;
generate an instantiated context model in the memory, where the processor is programmed to:
establish inter-document references between each of the gathered instance documents and a plurality of other instance documents;
aggregate according to the inter-document references;
create a context model associated with policies used in SOA policy generation, where the context model comprises a set of abstract extensible markup language (XML) Schema documents;
describe the set of abstract XML Schema documents in XML Schema Definition Language; and
for each abstract XML Schema document of the set of abstract XML Schema documents, replace the respective abstract XML Schema document with a corresponding XML instance document to generate the instantiated context model; and
where the processor is further programmed to:
apply a plurality of pre-generated context model based policies, with each context model based policy in a condition-action format.

3. A computer program product, comprising:
a computer readable storage medium having computer readable program code embodied therewith, where the computer readable storage medium is not a transitory signal per se and where the computer readable program code when executed on a computer implementation of a policy engine device causes the computer to:
gather instance documents related to policy enforcement according to a business requirement, where the instance documents are instantiated from corresponding schema documents;
generate an instantiated context model, where the computer readable program code when executed on the computer implementation of the policy engine device causes the computer to:
establish inter-document references between each of the gathered instance documents and a plurality of other instance documents;
aggregate according to the inter-document references;
create a context model associated with policies used in SOA policy generation, where the context model comprises a set of abstract extensible markup language (XML) Schema documents;
describe the set of abstract XML Schema documents in XML Schema Definition Language; and
for each abstract XML Schema document of the set of abstract XML Schema documents, replace the respective abstract XML Schema document with a corresponding XML instance document to generate the instantiated context model; and
where the computer readable program code when executed on the computer implementation of the policy engine device further causes the computer to:
apply a plurality of pre-generated context model based policies, with each context model based policy in a condition-action format.

* * * * *